United States Patent [19]

Fukaya et al.

[11] Patent Number: 4,715,524
[45] Date of Patent: Dec. 29, 1987

[54] ASSEMBLY OF PARTS TO BE FORMED INTO A T-JOINT WELD

[75] Inventors: Yasuhiro Fukaya; Nagio Minami, both of Hiroshima, Japan

[73] Assignee: Mitsubishi Jukogyo Kabushiki Kaisha, Tokyo, Japan

[21] Appl. No.: 838,618

[22] Filed: Mar. 12, 1986

[30] Foreign Application Priority Data

Feb. 13, 1986 [JP] Japan .................................. 61-27970

[51] Int. Cl.$^4$ .............................................. B23K 9/02
[52] U.S. Cl. ..................................... 228/165; 228/167; 228/174
[58] Field of Search ................ 228/165, 166, 167, 174

[56] References Cited

U.S. PATENT DOCUMENTS

| 1,754,721 | 4/1930 | Linden | 228/165 |
| 1,934,822 | 11/1933 | Sawyer | 228/165 |
| 1,939,732 | 12/1933 | Stresau | 228/165 |
| 4,097,716 | 6/1978 | Reichelt | 228/166 |

FOREIGN PATENT DOCUMENTS 0033192 4/1981 Japan .................................. 228/166

Primary Examiner—Kurt Rowan
Attorney, Agent, or Firm—Wenderoth, Lind & Ponack

[57] ABSTRACT

A T-jointing weld beveling for welding a plate member to a rib-like member having a varying thickness in a T-shaped manner is improved in that a beveling width changes in accordance with the thickness of the rib-like member and the edges of the beveled portion are wave-shaped so as to form intermittent gap space portions between the rib-like member and said edges, whereby uniform penetration beads can be formed, the welding can be achieved with a small electric current over the entire length of the rib-like member, and control of a welding condition can be facilitated.

3 Claims, 14 Drawing Figures

ASSEMBLY OF PARTS TO BE FORMED INTO A T-JOINT WELD

BACKGROUND OF THE INVENTION

1. Field of the Invention

The present invention relates to an assembly of parts to be formed into a T-joint weld that is applicable to manufacturing of an impeller in a compressor or the like.

2. Description of the Prior Art

Heretofore, upon welding an impeller in a compressor, an assembly of the parts to be formed into a T-joint weld as shown in FIG. 5 has been employed. In FIG. 5, reference character (a) designates a lower plate, reference character (b) designates a rib provided on the lower plate (a), reference character (c) designates an upper plate, and reference character (d) designates a beveling provided in the upper plate (c). The above-mentioned rib (b) has a thickness which gradually increases from its thin portion of about 2 mm in thickness to its thick portion of about 8-10 mm in thickness, and the width of the opening in the above-mentioned beveling (d) changes linearly in accordance with the variation of the thickness of the rib (b), so that width of the overlapped part of the rib (b) and the upper plate (c) is nearly constant over the entire length of the rib (b).

In the case where the thickness of the rib (b) increases from its thin portion of about 2 mm in thickness to its thick portion of about 8-10 mm in thickness and on the other hand the width of the rib (b) overlapped by the upper plate (c) is nearly constant over the entire length of the rib (b) as described above, even if the welding condition is changed depending upon the thickness of the rib (b), there still remain the following problems. That is, even if the thin-walled portion of the rib (b) is welded under a small current welding condition, since this portion of the rib (b) has a poor heat transfer capability, heat is accumulated in that portion of the rib (b), and hence the thin-walled portion of the rib (b) has a deep weld penetration as illustrated in FIG. 6(I)→FIG. 6(II), weld metal (e) melts and falls, and so, penetration beads cannot be formed. Moreover, in the middle portion of the rib (b) where its thickness increases successively, there exists the problem that it is necessary to control the welding condition precisely and continuously in accordance with the thickness of the rib (b) and hence control of the welding condition becomes troublesome.

SUMMARY OF THE INVENTION

It is therefore one object of the present invention to provide an improved assembly of parts to be formed into a beveled T-joint weld in which uniform penetration beads can be formed without making weld metal melt and fall, a rib-like member can be welded to a plate member with a small current over the entire length of the rib-like member, and control of the welding condition is facilitated.

According to one feature of the present invention, there is provided an assembly of parts for welding a plate member to a rib-like member in a T-joint weld having a varying thickness, in which the beveling width changes in accordance with the thickness of the rib-like member and the edges of the beveled portion are wave-shaped so as to form intermittent gap portions between the rib-like member and the edges.

In the assembly of parts according to the present invention, since the beveling width changes in accordance with the thickness of the rib-like member and the edges of the beveled portion are wave-shaped so as to form intermittent gap portions between the rib-like member and the edges as described above, heat is hardly transferred from the weld metal to the rib-like member in the range extending from its thin-walled portion having a poor heat transfer capability up to its middle portion, and hence heat will not be accumulated in the thin-walled portion of the rib-like member, deep weld penetration will not occur at this portion, weld metal would not melt and fall, and so, uniform penetration beads can be formed. Moreover, since a beveling which forms intermittent gap portions between the rib-like member and the beveled edges is formed in the plate member as described above, even if the welding condition is not changed precisely and continuously in accordance with the thickness of the rib-like member, the rib-like member can be welded to the plate member over the entire length of the rib-like member, and so, control of the welding condition is facilitated.

The above-mentioned and other objects, features and advantages of the present invention will become more apparent by reference to the following description of preferred embodiments of the invention taken in conjunction with the accompanying drawings.

BRIEF DESCRIPTION OF THE DRAWINGS

In the accompanying drawings:

FIGS. 2(I) to 2(VI) are vertical cross-section views of the structure shown in FIG. 1, respectively taken along line I—I to line VI—VI in FIG. 1;

FIGS. 4(I) and 4(II) are vertical cross-section views showing the welding operation making use of the assembly of parts according to the present invention as illustrated in FIGS. 1 to 3;

FIGS. 6(I) and 6(II) are vertical cross-section views showing the welding operation making use of the assembly of parts in the prior art as illustrated in FIG. 5.

DESCRIPTION OF THE PREFERRED EMBODIMENTS

Figure 1:
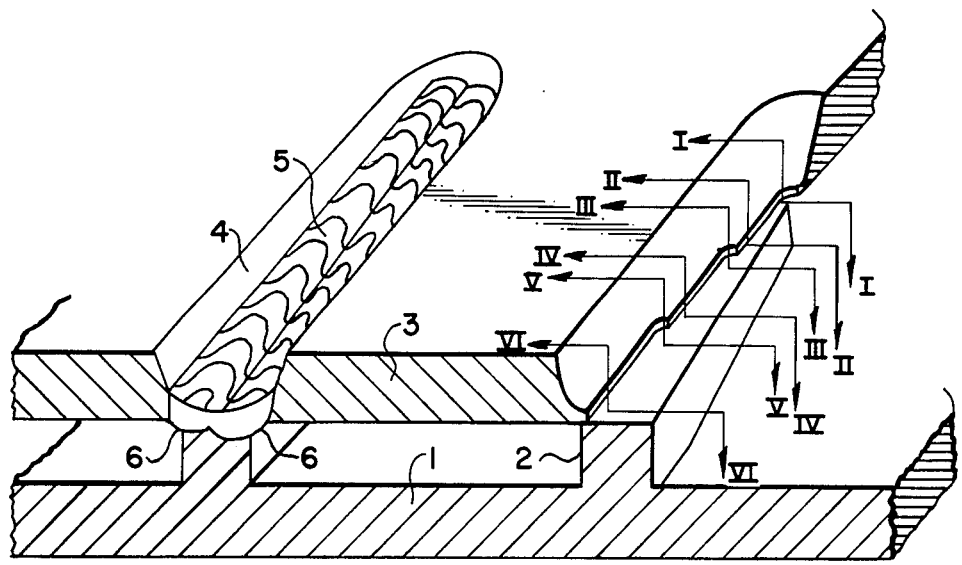
FIG. 1 is a perspective view showing one preferred embodiment of an assembly of parts to be welded into a T-joint weld according to the present invention.
Figure 2:
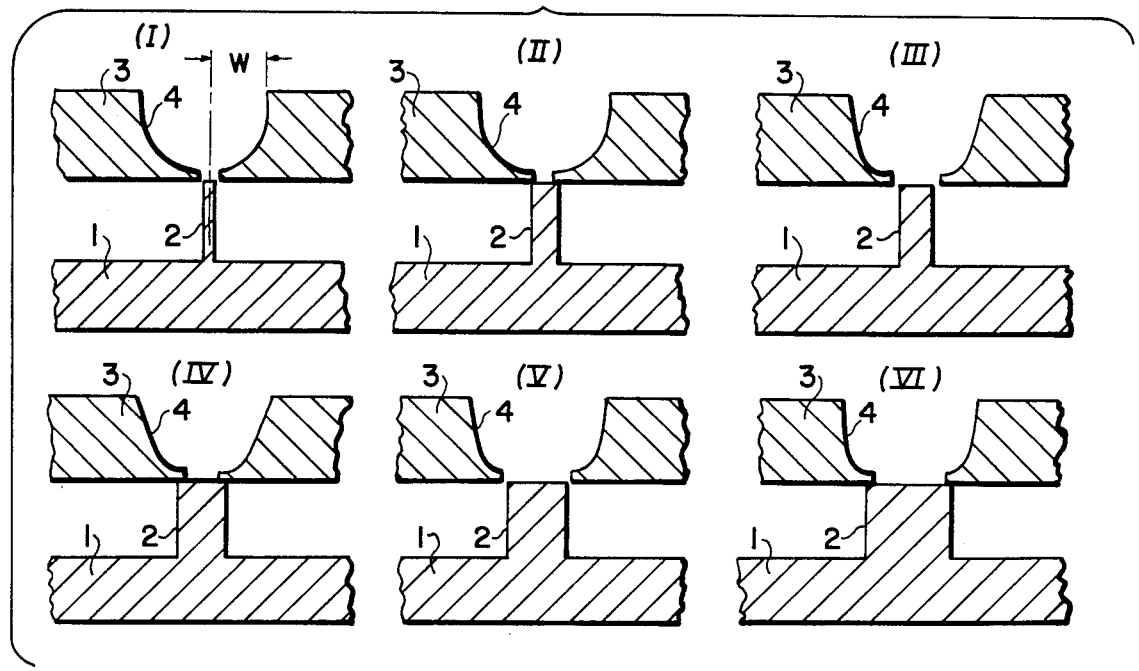

Now a description will be made of the assembly of parts to be welded into a T-joint weld according to to the present invention in connection to the preferred embodiments of the invention illustrated in FIGS. 1 through 4. In FIGS. 1 and 2, reference numeral (1) designates a lower plate, reference numeral (2) designates ribs provided on the lower plate (1), and as will be seen from FIGS. 2(I) to 2(VI), each of the ribs (2) has its thickness increasing gradually from its thin-walled portion (FIG. 2(I)) to its thick-walled portion (FIG. 2(VI)). In addition, reference numeral (3) designates upper plates extending between the tops of ribs 2, numeral (4) designates beveled edge portions provided on the upper plates (3), these beveled edge portions (4) having the width W changing so as to decrease with an increase the wall thickness of the rib (2) and having lower edges formed in an elongated scalloped shape, as shown in FIG. 1 and in FIGS. 3(I) and 3(II), having substantially straight elongated edge parts 4, joined by curved edge parts $4_2$, with the elongated edge parts at a smaller angle to the length of the corresponding rib than the faces $2_1$ and $2_2$ of the rib so that intermittent gap portions (B) and overlapping portions (A) are formed between the above-described rib (2) and the lower edges. Also, in FIGS. 1 and 3(I), reference numeral (5) designates weld metal, and numeral (6) designates penetration beads.

Now, the welding operations making use of the above-described assembly will be explained in greater detail. The upper plate (3) and the rib (2) are welded to each other in a T-shaped manner by the weld metal (5) as shown in the left half portion of FIG. 1, and penetration beads (6) are formed on the backside of the weld metal (5). In the above-described welding, by way of example, it is assumed that Cr-Mo steel is used for the lower plate (1), the wall thickness of the thin-walled portion of the rib (2) is 2 mm, the wall thickness of the middle portion is 4 mm, the wall thickness of the thick-walled portion is 8 mm and the pitch of the ribs (2) is 50 mm. In addition, with regard to the width of the opening between the opposed lower edges of the beveled edge portions (4), the width of the opening at the thin-walled portion of the rib (2) being 3 mm, the width of the opening at the middle portion of the rib (2) being 5 mm, the width of the opening at the thick-walled portion of the rib (2) being 7 mm, and between the elongated edge parts 4, and the rib (2) are formed gap portions (B) of 0.5 mm or less in width and overlapped portions (A) of 0.5 mm or less in width. More particular, in the thin-walled portion of the rib (2) shown in FIG. 2(I), gap portions (B) of 0.5 mm or less in width are formed between the opposite side surfaces $2_1$ and $2_2$ of the thin-walled portion and the opposite side edge parts of the beveled edge portions (4); in the middle portion of the rib (2) shown in FIGS. 2(II) to 2(V), gap portions (B) and overlapped portions (A) both of 0.5 mm or less in width are formed between the opposite side surfaces $2_1$ and $2_2$ of the middle portion and the opposite side edge parts of the beveled edge portions (4); and in the thick-walled portion of the rib (2) shown in FIG. 2(VI), overlapped portions (A) of 0.5 mm or less in width are formed between the opposite side surfaces $2_1$ and $2_2$ of the thick-walled portion and the opposite side edge parts of the beveled edge portions (4).

Figure 3I:
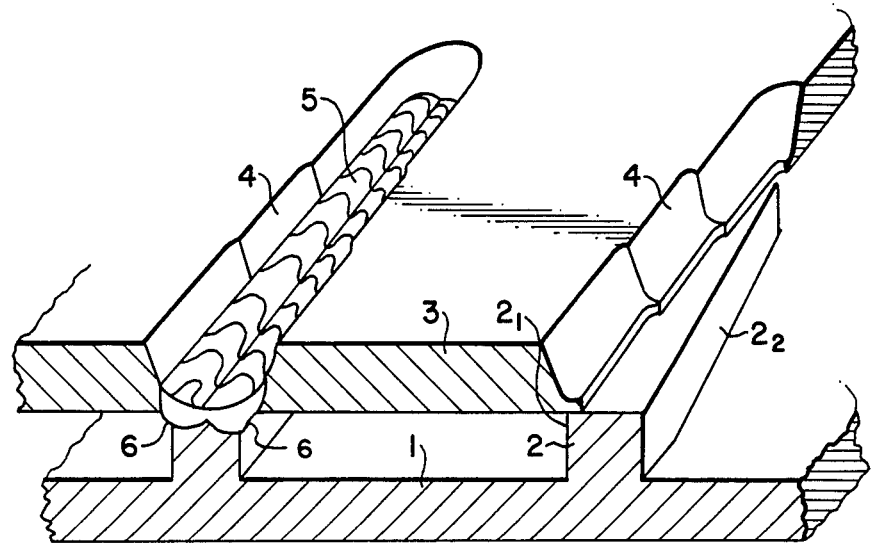
FIG. 3(I) is a perspective view showing another preferred embodiment of an assembly of parts according to the present invention.
Figure 3:
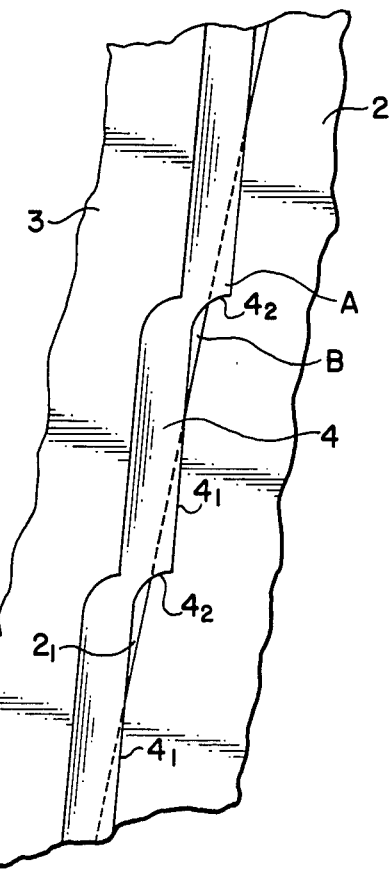
FIG. 3(II) is a plan view of the same.
Figure 4:
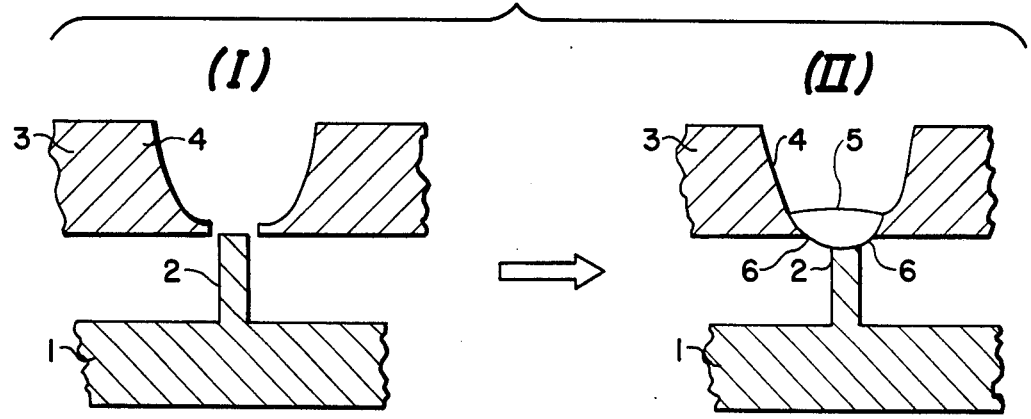
Figure 5:
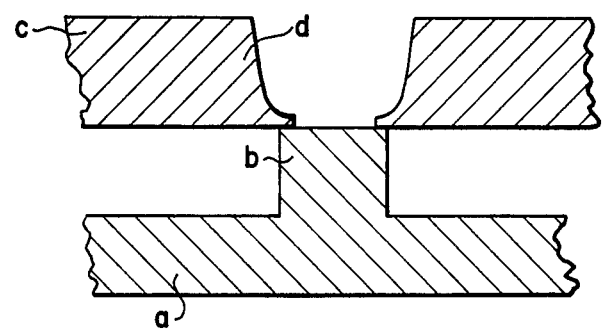
FIG. 5 is a vertical cross-section side view showing an assembly of parts to be welded into a T-joint weld according to the prior art.
Figure 6:
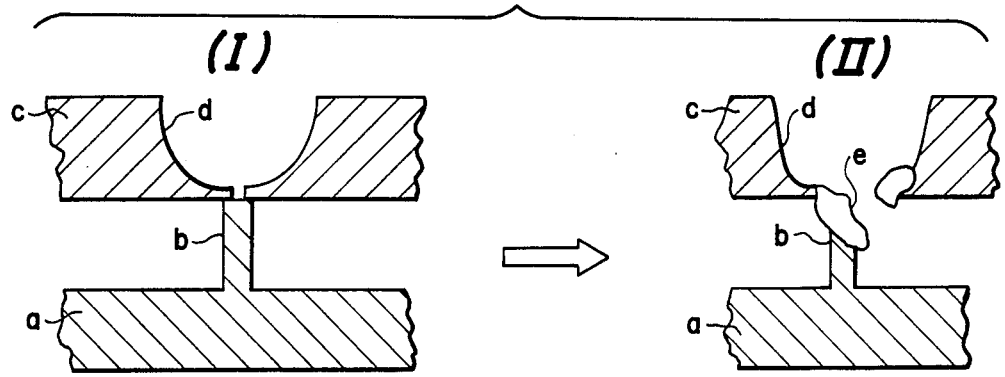

When welding was effected under the above-described condition, at the portion of the beveled edge portions 4 at the thin-walled portion of the rib having gap spaces (B) of 0.5 mm in width, uniform penetration beads (6) were obtained with a welding current of 90A (See FIG. 4(I)→FIG. 4(II)). Also, at the portion of the beveled edge portions 4 at the middle portion (the wall thickness varying portion) of the rib having gap spaces (B) and overlapped portions (A) both of 0.5 mm in width, uniform penetration beads (6) were obtained with a welding current of 120A. In addition, at the portion of the beveled edge portions 4 at the thick-walled portion of the rib having overlapped portions (A) of 0.5 mm in width, welding was effected with a welding current of 150A similarly to the prior art, and in this case also, uniform penetration beads (6) were obtained. It is to be noted that with regard to the beveled edge portions (4), either only the lower edges of the beveled edge portions can be changed in accordance with the variation of the wall thickness of the rib (2) or the entire beveled edge portions from the bottom to the top can be changed in accordance with the variation of the wall thickness of the rib (2). FIGS. 3(I) and 3(II) illustrate the latter case.

As described in detail above, in the assembly of parts according to the present invention, the width of the beveled edge portion changes in accordance with the wall thickness of the rib-like member and the edges of the beveled edge portion are scallop-shaped so as to form intermittent gap space portions between the rib-like member and the edges, so that hardly any heat is transferred from the weld metal to the rib-like member in the range extending from its thin-walled portion having a poor heat transfer capability up to its middle portion. Thus heat is not accumulated in the thin-walled portion of the rib-like member, resulting in no deep weld penetration at this portion Weld metal will not melt and fall, and so, uniform penetration beads can be formed. In addition, since a beveled edge portion adapted to form intermittent gap portions between the rib-like member and the edges of the beveled edge portion is provided in the plate member as described above, the rib-like member can be welded to the plate member over the entire length of the rib-like member even if the welding condition is not changed precisely and continuously in accordance with the wall thickness of the rib-like member, and so, there exists an advantage that control of the welding condition is facilitated.

While the present invention has been described above in connection with preferred embodiments of the invention, it is intended that the present invention should not be limited to the illustrated embodiment but many changes and modifications in design could be made without departing from the spirit of the present invention.

What is claimed is:

1. An assembly of parts for being welded into a T-joint weld, comprising:
    a rib-like member having opposite faces and a thickness between said faces which increases from a thin end to a thick end, said faces being at an angle to the length of said rib-like member;
    a pair of plate members with spaced opposed edges;
    beveled edge portions on the opposed edges of said plate member, said beveled edge portions having at least the lower edges with an elongated scalloped shape constituted by substantially straight elongated edge parts joined by curved edge parts;
    said lower edges lying along the edges of the top surface of said rib-like member with said lower edges spaced from each other, and with the straight elongated edge parts at smaller angle to the length of the rib-like member than the faces of the rib-like member for forming gaps between the lower edges adjacent the curved edge parts and overlapping portions along the remainder of the edges;
    whereby when the assembly is welded for welding the plate members to the rib member, even if the welding conditions are not changed precisely and continuously along the length of the rib member, the weld will have good quality along the entire length of the rib member.

2. An assembly as claimed in claim 1 in which the width of the beveled edge portions, as measured in the direction parallel to the top surface of the plates and perpendicular to the length of said rib-like member, from the top of the beveled edge portion to the bottom of the beveled edge portion gradually decreases in the direction of increasing thickness of the rib-like member.

3. An assembly as claimed in claim 1 in which the entire face of the beveled edge portions is scallop-shaped in the same manner as said lower edges.

* * * * *